US005080789A

United States Patent [19]

Heranandez Alegre

[11] Patent Number: 5,080,789

[45] Date of Patent: Jan. 14, 1992

[54] HYDROEXTRACTOR FOR TEXTILE PIECES WITH SHAFT-DRIVEN MOTOR AND SUPPORT ROLLERS

[76] Inventor: Joaquín Heranandez Alegre, Saturnino Baquer, 3 2oA, Huesca, Spain

[21] Appl. No.: 532,553

[22] Filed: Jun. 4, 1990

[30] Foreign Application Priority Data

Jun. 6, 1989 [ES] Spain .................................... 8901833

[51] Int. Cl.[5] ..................... B01D 33/067; D06F 58/00; F26B 5/08

[52] U.S. Cl. ................................. 210/360.1; 68/19.2; 68/24; 68/140; 74/573 R; 134/157; 209/270; 384/46

[58] Field of Search ................... 34/58, 108; 68/23 R, 68/23.1, 140, 139, 19.2, 24, 26; 74/573 R; 210/236, 360.1, 380.1-380.3, 402, 403; 384/46, 52; 209/270; 134/157

[56] References Cited

U.S. PATENT DOCUMENTS 2,645,914 7/1953 Sessions ................................ 68/140
2,884,287 4/1959 Sommer ................................ 68/140
2,929,674 3/1960 Tann ........................................ 34/58
3,113,004 12/1963 Shaw ...................................... 68/140
3,824,813 7/1974 Davis ...................................... 68/19.2
4,236,999 12/1980 Burgess et al. ......................... 209/270
4,661,252 4/1987 Burgess .................................. 210/402

FOREIGN PATENT DOCUMENTS 429097 5/1926 Fed. Rep. of Germany ........ 68/140

*Primary Examiner*—Robert A. Dawson
*Assistant Examiner*—Joseph Drodge
*Attorney, Agent, or Firm*—Darby & Darby

[57] ABSTRACT

A hydroextractor which is mainly useful to carry out the industrial dedusting, rinsing and centrifuging of rugs, comprises a hollow cylindrical body (2) having holes in its surface. The cylindrical body is rotated around its longitudinal axis bya drive morot (7) connected to a shaft (6) connected to the closed end of the cylindrical body. The rotation of the cylindrical body is guided by pairs of rollers (9) placed on its periphery and which rotate in individual annular roller paths (8). The rollers are mounted by supports (10) and, in turn, support the cylindrical body.

1 Claim, 1 Drawing Sheet

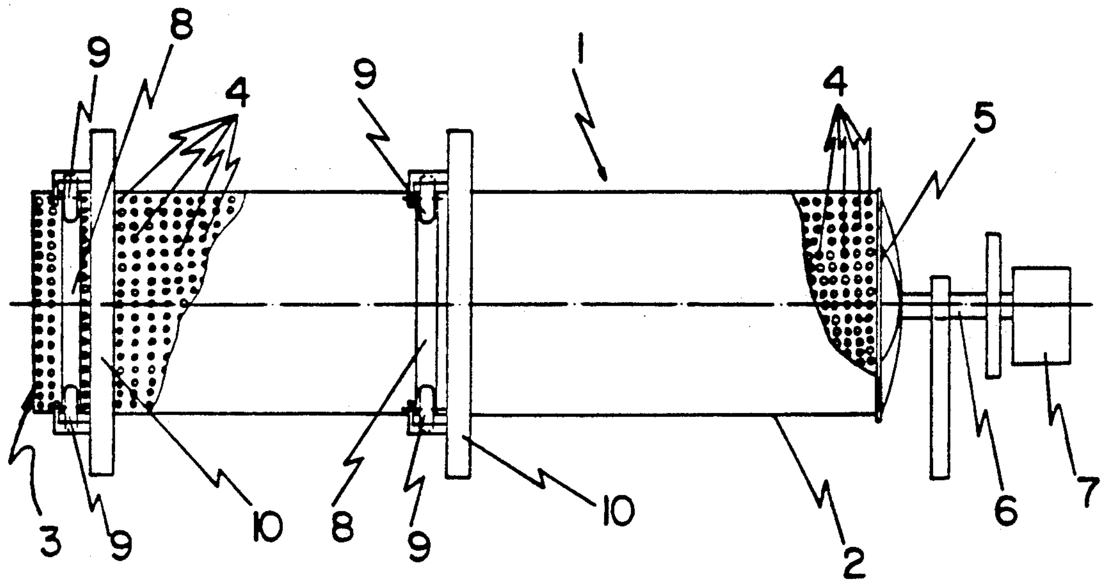
9
8
4
9
1
4
5
3
9
10
8
9
10
2
6
7

HYDROEXTRACTOR FOR TEXTILE PIECES WITH SHAFT-DRIVEN MOTOR AND SUPPORT ROLLERS

DESCRIPTION OF THE INVENTION

As is expressed in the title of the present specification, the present utility model consists of a hydroextractor for textile pieces, which is useful mainly for the industrial dedusting, rinsing and centrifuging of rugs.

The hydroextractor which is proposed in the present specification consists of a hollow cylindrical body with its side surface provided with a series of holes all along it and with one of its bases open, remaining guided by some pairs of wheels rotating in correspondence with the side surface thereof, being used for the industrial cleaning of rugs, in such a way that the textile pieces introduced in it remain practically dry. The textile piece finish drying by a short exposure at room temperature.

BACKGROUND OF THE INVENTION

The conventional way of cleaning rugs is done by dedusting, washing by mechanical brushes and with ideal soaps, rinsing and squeezing dry and subsequent heat drying.

Thus, the rinsing is done with pressurized water with slow and imperfect results.

The squeezing dry is done by passing the piece between a pair of rotating rollers, which upon moving between them, causes the squeezing out of the water. Or this may be done by water aspirators. Water aspirators have the inconvenience that they may cause the pieces to wear.

The drying is done in heat ovens, which cause an imperfect finish or else they are hung out to dry just like conventional clothing. This causes the water to drop to the floor as the squeezing out of water is not perfect and thus the water contained in the entire piece accumulates in the bottom thereof.

This way of cleaning rugs makes it a very laborious task since it is very hard to handle wet rugs, since in the event of their being large pieces, as the case normally is, their weight increases considerably and it is very difficult to handle them.

DESCRIPTION OF THE INVENTION

The hydroextractor for textile pieces which is described in the present specification consists of a hollow cylindrical body preferably made out of stainless steel open at one of its bases. It remains connected by its other closed base to an shaft connected with the drive motor, while all of its side surface is provided with some holes so that the water can go out.

The cylindrical body, depending on its length, is provided with one or several perimetric paths on its side surface for the guiding thereof by means of some pairs of wheels rotating in correspondence with them. These wheels remain mounted on the corresponding supports.

Thus, the textile pieces are introduced once they are wet and washed in the inside of the cylindrical body, until the entire length thereof is covered. The cylindrical body begins to rotate and the rinsing, dedusting and centrifuging take place. If desired fabric softeners and sizing materials can be added. The pieces remain practically dry and the final drying thereof is done at room temperature with a brief exposure time.

The cylindrical body remains covered by a body to collect the water that is expelled through its holes. It may be useful not only for rugs but also for quilts, blankets and other similar pieces.

The construction of the hydroextractor may be based on a support system, whereby it is not necessary to anchor the same in concrete.

In order to complement the description that is going to be made hereinafter and for the purpose of providing a better understanding of the features thereof the present specification is accompanied by a diagram in whose sole figure the most significant details of the invention are represented.

BRIEF DESCRIPTION OF THE FIGURE

The FIGURE shows a side raised view of the hydroextractor for textile pieces wherein one observes the hollow cylindrical body with the holes on its side surface and with the roller paths for the guiding wheels, as well as the shaft for connection to the closed base thereof and to the drive motor.

DESCRIPTION OF A PREFERRED EMBODIMENT

In view of the commented figure and in accordance with the numbering used, we can see how the hydroextractor (1) consists of a hollow cylindrical body (2), open at one of its bases (3), its entire side surface provided with some holes (4) so that the water removed from the pieces placed inside it may go out. The pieces are placed inside the cylinder wet for their rinsing, dedusting and centrifuging. The cylindrical body (2) remains surrounded by a structure which collects the water which comes out through the holes (4.)

The closed base (5) of the hollow cylindrical body (2) remains connected to the shaft (6) connected to the motor (7) to transmit the rotary movement to the hydroextractor (1.)

The cylindrical body (2) has around the circumference of its outside surface annular roller paths (8) in which are positioned bearings or rollers (9). The rollers (9) are secured to the supports (10.)

In this way, when the rugs have been washed, they will be introduced in the inside of the cylindrical body (2) until the entire length thereof has been covered. If desired, fabric softeners and sizing materials may be added. The cylinder (2) begins to rotate and the rugs remain practically dry, without enduring any wear. The cylindrical body (2) may have normal or automatic operation.

Thus, the difficult handling of rugs resulting from their heaviness is avoided, as well as the need to use heat ovens for the final drying thereof, or water aspirators, which may cause wear thereof.

The hydroextractor (1) will likewise be useful to rinse quilts, blankets or other similar textile pieces which are difficult to handle due to their weight especially when they are wet as the weight thereof increases considerably.

The hydroextractor (1) may or may not be anchored and it may or may not have a casing.

What is claimed is:

1. A hydroextractor for drying textile pieces comprising:

a hollow cylindrical body for receiving the textile pieces and having an outside surface and a length, said body having an open end a closed end the entire length of said body having a plurality of holes through the body outside surface, the surface of said body having an roller path extending around a circumference outside of the outside surface of said body;

a support for said body;

a drive motor for rotating said body connected via a shaft to the closed end of said body; and a pair of rollers mounted by said support and rotatable in said roller path, thereby supporting said body during rotation of said body by said drive motor.

* * * * *